Patented May 6, 1947

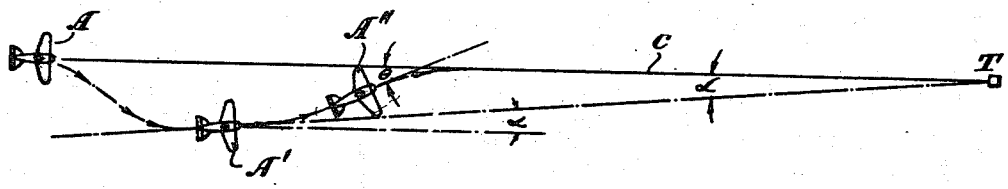
May 6, 1947.  R. B. ROE ET AL  2,419,970
NAVIGATION SYSTEM
Filed May 29, 1943  2 Sheets-Sheet 1
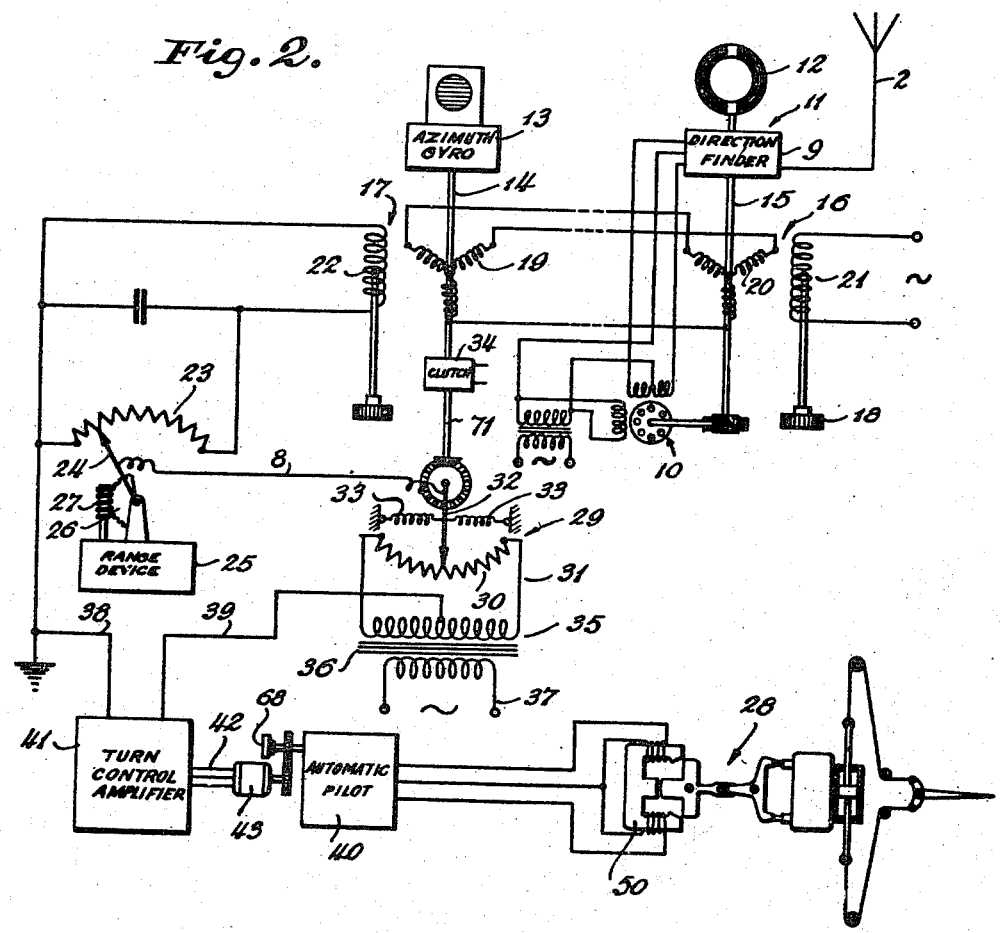
INVENTORS
ROBERT B. ROE
BY JOHN B. GRAY
ATTORNEY

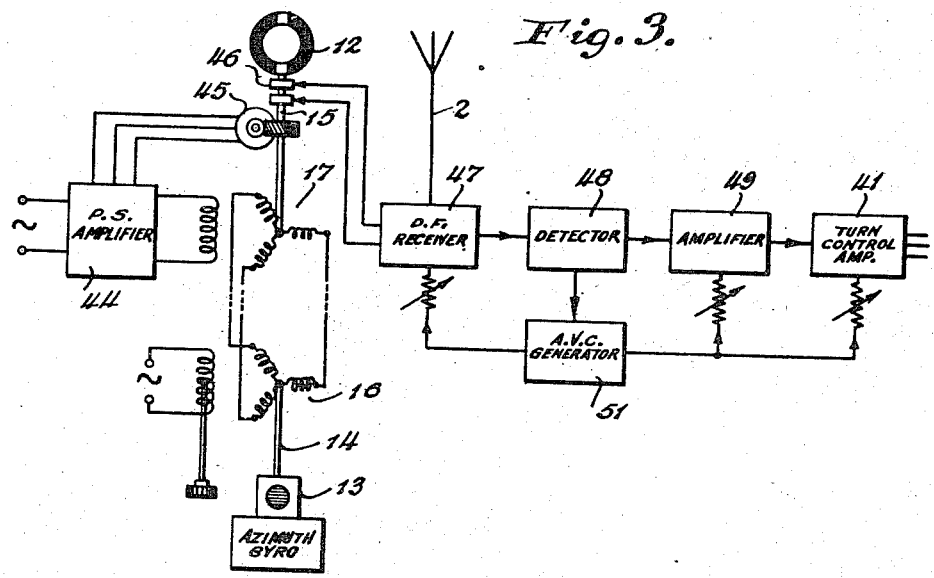

2,419,970

UNITED STATES PATENT OFFICE 2,419,970

NAVIGATION SYSTEM

Robert B. Roe, West Hempstead, and John B. Gray, Garden City, N. Y., assignors to Sperry Gyroscope Company, Inc., a corporation of New York Application May 29, 1943, Serial No. 488,994

18 Claims. (Cl. 250—2)

This invention relates to navigation systems and more especially to systems wherein a craft, such as a ship or airplane, follows a homing course on a radio transmitter.

It is common practice to direct a craft along a predetermined course or ground track toward a radio transmitter by correcting for deviations from the course in response to a difference between the initial bearing of the transmitting station from the craft (which usually corresponds to the craft's heading) and the new bearing of the transmitting station from the craft caused by a displacement from course due to side winds. As long as the craft remains on its course, no change takes place in such bearing, i. e., no difference occurs between the heading and bearing readings even though the craft may temporarily yaw or alter its heading from the desired line of flight. The original heading of the plane ordinarily is preserved as a reference by any conventional mechanism stabilized in azimuth, as for example, a magnetic compass, a directional gyro, or other means for maintaining a stabilized position in azimuth. Therefore, as the craft deviates from its course, its bearing relative to the transmitter varies by an amount which may be determined by comparison with the original heading, e. g. with the position of the gyro unit.

It is customary to measure the bearing of the station from the craft by means of a directive antenna, such as a direction-finding loop. The directional antenna may be of the self-orienting type, as disclosed in the patent to Moseley, No. 2,257,757, dated October 7, 1941, for Radio compass navigation apparatus, in which displacement of the craft from the desired ground track is measured as a function of the difference between the respective angular positions of the directional antenna and the steady position of the gyro device. In other cases the position of the directional antenna is maintained constant in azimuth by a stabilized directional gyro, and the change in bearing of the craft is determined as a function of the signal voltage developed in the directional antenna, as more fully disclosed in W. G. Harding Patent No. 2,201,174 dated May 21, 1940. In either case, means are provided for deriving signals from the change in the bearing of the transmitting station from the craft to provide a corrective movement of the craft in such a direction as to erase or overcome the deviation.

With either of the foregoing systems, the directional antenna system provides an indication of the departure as a function of the deviation angle formed by the predetermined course and a line extending from the transmitter to the new position of the craft. Hence, a departure of two miles from course when the craft is 100 miles from the transmitting station provides the same indication and ordinarily evokes the same correction to the craft movement as a departure of two-tenths mile when the craft is only 10 miles from the homing station. Thus a correction suitable in the first case for a large departure provides over-correction in the second case, where the departure is small. Unless some provision is made to lessen or "soften" the response as the craft nears the homing station, violent corrective reactions may result from moderate departures from course, and the craft is caused to oscillate or hunt as it nears its destination.

This disadvantage has been corrected with the present invention by coordinating the extent of the corrective responses applied to the rudder control mechanism of the craft in some manner with the distance of the craft from the transmitting station.

The principal objects of the present invention are: to provide an improved navigation system wherein responses to deviations of the craft from course are lessened or softened as the craft approaches the transmitting station; to provide an improved system for coordinating the corrected heading of the craft as it is returned to its course with the signal strength of the received direction-finding signals, thus causing the craft to be brought back to its original straight ground track without over-shooting or hunting; and to provide improved methods of and apparatus for varying the extent to which the heading of the craft is changed in response to signals designating departure of a craft from its course as a direct function of the distance between the craft and the transmitting station.

These and other objects of the invention will become more apparent from the following description and from the accompanying drawings illustrating several embodiments of the present invention.

In the drawings,

Fig. 1 is a diagram depicting a craft, such as an airplane, in several successive positions relative to a predetermined course or ground track extending from the craft to a transmitting station, certain angles and distances being exaggerated for emphasis and clarity;

Fig. 2 is a schematic arrangement of one form of aparatus embodying principles of the invention that may be installed in a craft to provide varying sensitivity of the course-correcting mechanism to the deviation impulses as the craft proceeds along its course;

Fig. 3 is a schematic diagram of an alternative arrangement of parts for providing variable sensitivity of the craft control device to the deviation-indicating signals.

Generally speaking, the invention comprehends deriving a signal corresponding in magnitude to the extent or actual distance that the craft has deviated or departed from a predetermined course, such a course being a straight line to a radio station along the initial bearing on which the signals from the radio station are received. In the ordinary case, this signal is determined as the change in the position of a self-orienting direction-finding loop relative to a predetermined norm in azimuth, established, for example, by a gyro-controlled unit. The deviation produces a signal that is used to control a rudder or similar steering device so as to restore the craft to its course in the most efficient manner.

When the craft is at a large distance from the transmitting station, a change of the radio station bearing by a given deviation angle, e. g., 1°, requires a relatively large change of heading of the craft back toward the course, whereas when the craft is near the transmitting station a similar bearing deviation should result in a much smaller change of heading of the craft. Accordingly, use is made of some function of the distance between the craft and the station, typically the energy level of the received radio energy, as a determinant of the sensitivity of the corrective action. Specifically, a change of bearing of the received station by a deviation angle of 1° may be made to provide a craft heading correction of from 6 to 10 degrees while the craft is at a great distance from the transmitting station, but to provide a heading correction of 1 to 3 degrees for an equal station bearing deviation angle when the craft is near the station.

Referring now more particularly to the drawings, Fig. 1 illustrates the principles of the invention as applied to a dirigible craft, such as an aircraft, commencing at A a homing flight toward a radio station T. The line C represents the intended course or straight line of flight to station T. The craft is directed along a heading equal to the bearing of station T (i. e., the craft axis is aligned with course C) and the craft autopilot is set to maintain the craft oriented to this heading—i. e., to maintain the craft axis parallel to course C. The craft may depart from its course, for example, by being blown transversely, as by a cross wind, to the position A', shown at an exaggerated distance from the course. The direction-finding equipment on the craft then denotes a radio station bearing deviation angle $\alpha$, representing the change in bearing as a result of the craft's lateral displacement from course C. It will be apparent from Fig. 1 that the magnitude of the lateral displacement resulting in the angle $\alpha$ is proportional to the distance of the craft from the station T. The craft accordingly is turned so that the craft heading is different from the original bearing of the station T by a correction angle $\theta$, as indicated at A'' in Fig. 1, the size of the angle $\theta$ being made substantially proportional to angle $\alpha$, by a proportionality factor varying as a function of the distance of the craft from the transmitting station. Thus a large correction is provided by introducing a large corrective angle $\theta$ for a given bearing deviation angle $\alpha$ when the plane is remote from the station, whereas much smaller heading correction $\theta$ is provided for the given angle $\alpha$ when the craft is near the station. Although the invention is herein described specifically as applied to an airplane, it is manifest that the principles are applicable equally well to the control of other dirigible vehicles or vessels.

A typical embodiment of the present invention appears in Fig. 2. A direction finder 11 is provided with the usual non-directional antenna 2 and a directional antenna such as a loop 12, adapted to orient itself continuously relative to a source of radiant energy in a manner well known in the art. for example, as shown in Fig. 3 of the aforesaid Moseley patent, to provide a continuous indication of the bearing of the craft relative to such source. A motor 10, controlled by signals from the receiver 9, maintains the loop 12 in the null position. A positional reference, stabilized in azimuth, is provided by a suitable reference device 13 comprising, for example, a north-seeking magnetic compass or an azimuth or directional gyro adapted to maintain a position relative to the original course heading.

The frame or casing of the azimuth gyro 13 and of the direction finder 11 may be secured directly to the craft, while shafts 14 and 15 extend from the vertical ring of the gyro and from the rotatable loop, respectively, for rotational movement relative to the craft, as the heading changes. The shafts 14 and 15 are connected to the rotors 19 and 20 of a Selsyn set comprising a self-synchronous transmitter 16 and a self-synchronous receiver 17, interconnected as shown in Fig. 2. The stator 21 of the Selsyn 16 is energized by a suitable source of alternating current, and its position may be adjusted as by a manually controlled knob 18 to provide an initial course setting. The voltage induced in stator 22 is a function of the difference in the orientations of the respective rotors 19 and 20, a zero output signal occurring when the respective rotors are in alignment. The respective rotors and stators may be interchanged if desired, so that the three-winding element in each case is stationary. The output signal is developed across the resistance winding of a potentiometer 23, one terminal of which is grounded. A slider 24 is automatically adjusted along the resistance to vary the output signal in accordance with the range or distance of the transmitting station from the craft.

The range device 25 employed for this purpose may be of any conventional design suitable for varying the position of the slider 24 as the craft approaches the station. One roughly acceptable device satisfactory for the purpose is a clock mechanism coordinated with the craft speed so as to produce a complete movement of the pointer or slider 24 during the time interval extending from the beginning to the end of the trip. Where the actual distance travelled can be accurately determined, the device 25 may comprise an odometer arranged to provide movement of the slider 24 over the full operating range as the craft progresses from starting point to destination. Otherwise the range device 25 may comprise any well known type of distance computer operating on optical or electronic principles. Typical of the last-mentioned type are the well known radio distance computer systems which measure the travel time required for electromagnetic energy to make a round trip between two points, e. g., between the craft and the station.

As diagrammatically indicated in Fig. 2, the slider 24 may be positioned along the resistance by the rotation of a gear segment 26 operated by a worm 27 in response to the range indication. The voltage developed across the potentiometer 23 may operate a suitable rudder control mechanism 28, as will more fully appear. A repeat-back device 29 restores the rudder to a neutral position when the craft is corrected by an angle θ determined by the signal developed across the output circuit of potentiometer 23.

As shown in Fig. 2, the repeat-back mechanism 29 may comprise a potentiometer 31 having its resistance winding 30 fixed relative to the craft. A slider 32 is normally held at a neutral position on the winding 30 as by means of weak opposed springs 33. The slider 32 may be shifted along the resistance 30 to vary the ratio of the respective arms as the craft changes its heading, by a connection 71 between the slider and the shaft 14 of the azimuth gyro 13. Accordingly, as the craft changes its direction to provide a corrective motion, the slider 32 is correspondingly moved along the resistance element 30.

A clutch 34, electrically or mechanically operable, is interposed between the shaft 14 and the slider 32, so that when the clutch is disengaged the slider 32 is urged to the neutral position on the resistor 30 by the spring 33. The resistance element 30 is connected across the center-tapped secondary winding 35 of a transformer 36, the primary winding 37 of which is energized by a suitable source of alternating current. By electrically connecting the sliders 24 and 32 by conductor 8, and by deriving a signal from wires 38 and 39, extending from ground and the center tap of winding 35 respectively, the craft may be made to turn until it reaches a predetermined angle, proportioned by the strength of the signal generated at winding 22 (which in turn is a function of the angular deviation between the original heading and the new bearing of the transmitter from the craft) and by the range device 25. The signals may be introduced within a turn control amplifier 41 having output connections 42 energizing an amplifier-controlled reversible motor 43 to rotate the heading control 68 of an automatic pilot 40. The arrangement of parts may be of the general type shown in B. A. Wittkuhns, Patent 2,372,185, issued March 27, 1945, simplified if desired by a direct connection between the amplifier-controlled reversible motor and the turn-control 68.

The operation of the device shown in Fig. 2, although fairly obvious, may be summarized as follows. The positions of the azimuth gyro and the direction finder loop are fixed relative to one another while the craft is on its course and headed toward the transmitting station. No signal is produced in the winding 22 from short period deviations of heading of the craft while the craft remains substantially on course because the rotors 19 and 20 rotate through the same angle and their relative positions remain unchanged. However, if the draft definitely deviates from its course, resulting in a change in its position to the position A' (Fig. 1), a difference α occurs between the new bearing of the station from the craft (or, what amounts to the same thing, the craft from the station) and the original bearing, resulting in a shift in position between the rotors 19 and 20, thereby producing a signal in the stator 22. The portion of this signal across the tapped turns of potentiometer 23 is applied to the turn control amplifier 41 with the slider 32 in the neutral position as shown.

The amount of this signal for a given deviation angle α is an inverse function of the distance of the craft from the transmitting station, and, accordingly, of the position of the slides 24. The turn control amplifier operates the motor 43 to rotate the heading control 68 through a given angle. This in turn displaces the pick-off in the automatic pilot 40 through an angle θ and thus operates the servo motor 50 of the rudder mechanism 28 (and aileron controls, where necessary) to produce a heading correction angle θ in proportion to the input signal, whereby the craft is turned toward the position A" as shown in Fig. 1.

As the craft is turned toward the course, the slider 32 is moved by the azimuth gyro 13 along the resistance 30 until the potential of slider 32 due to the secondary 35 of transformer 36 is equal in magnitude and opposite in phase to the potential of slider 24 of potentiometer 23 due to the signal from stator 22, thus erasing the signal and restoring the rudder to a neutral position. Under ideal conditions the signal appearing across stator 22 progressively decreases as the craft approaches its course causing turn control amplifier 41 to drive motor 43 in the opposite direction and ultimately to apply opposite rudder so as to reduce the angle θ in Fig. 1. Slider 32 of potentiometer 31 will then be restored gradually to the middle position of resistance 30, whereby the craft will return in a substantially tangential manner to the original course or straight ground track to the transmitter. It will be noticed that the signal in stator 22 is independent of the heading or orientation of the craft, and depends only on the angular relation between the azimuth gyro 13 and the direction finder loop 12. Hence, it is not a condition of quiescence of the controls that the fore and aft line of the craft should be parallel with the ground track. From this, it obviously follows that in the presence of a side wind the apparatus will automatically set up the proper drift angle.

The angular movement required of slider 24, and accordingly the corrective angle θ necessary to erase the signal is determined by the circuit constants employed. Preferably when the craft is in the farthest region from the station T a corrective angle of from 6 to 10 degrees has been found satisfactory for a degree of deviation angle α, this ratio being reduced materially as the craft approaches near the station, so that in the vicinity of the station the ratio of θ/α may be approximately unity or less. When the craft is about to fly over the station, any slight departure from course may produce in an extreme reaction even when the ratio is unity, so that immediately adjacent to the station, a ratio of close to zero may be employed. Although a ratio of less than unity will not direct the craft exactly to the station, the maximum departure from course is so small, when the ratio nears zero, that no appreciable error results. The craft motion is thus stabilized at the critical moment that the craft flies by the station, and the departure is corrected on the opposite side of the station as the craft increases its distance from the station.

Fig. 3 discloses a modified form of the invention wherein corresponding parts have been identified with the same reference characters. In the arrangement of Fig. 3, the loop 12 is stabilized in azimuth by means of the azimuth gyro 13, as shown in the previously-mentioned Harding patent. Selsyns 16 and 17 provide a phase sensitive amplifier 44 with positional data, so that the amplifier in turn may operate a servo motor 45 to maintain the loop 12 properly oriented relative to the gyro 13. As the craft deviates from its course to a direction-finding receiver 47, the input signal course, a loop signal is applied from slip rings 46 being a function of the deviation angle α which the plane of the loop 12 makes with the tangent of the wave front progressing from the transmitting station T. The signal from the receiver 47 is passed through a detector 48 and amplier 49 to the turn control amplifier 41.

The loop signal applied from the antenna to direction finding receiver 47 is independent of the orientation or heading of the craft itself; hence, the apparatus as described will automatically set up the proper drift angle to nullify the effect of a side wind.

Instead of using a range device 25 of the type described in connection with Fig. 2, use may be made of an automatic volume control generator 51, the input to which may be primarily controlled from the non-directional antenna 2, the strength of which is a direct function of the distance of the receiver from the transmitting station. The output of said generator 51 may be applied in a particular manner to vary the rudder control sensitivity to the input signal, that is, to vary the correction angle through which the craft is turned for a given input signal. The varying direct current bias voltage produced by the generator 51 may be applied to both the R. F. and A. F. stages of the direction-finding receiver system to increase the control effect, since the A. V. C. control increases as a power function of the number of stages to which the bias voltage is applied. By applying the control voltage to a number of stages, as shown, including an amplifier stage 49 beyond the point of energization of A. V. C. generator 51, the signal output of amplifier 49 may be reduced appreciably as the energy level rises from the signal output value obtaining at the threshold of A. V. C. operation. Reduction of output strength with the increase of strength of received signals is shown in U. S. Application 478,013, Thomas M. Ferrill, Jr., filed March 4, 1943.

According to the arrangement of Fig. 3, the signal from the direction-finding loop for a given angular deviation α has a reduced effect on the turn control amplifier as the signal strength of the received radiant energy increases during approach of the craft to the station. The A. V. C. generator 51 reduces the gain of unit 47 as the output of detector 48 increases, tending to suppress changes of output level of detector 48, but actually allowing a small change of output thereof in response to a very large change of input signal strength. By the connection of the A. V. C. generator to the amplifier 49, appreciable gain control action applied to this amplifier is made to more than compensate for the slight increase of output of detector 48 accompanying a large increase of input signal strength, so that the output of amplifier 49 (for a given deviation angle α) decreases as the receiver input signal strength increases.

Since may changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a navigation system, direction finding means, means responsive thereto for detecting variations from a norm in the bearing of a steerable craft relative to a source of radiant energy, steering means responsive to said variations for directing said craft toward said norm, and means responsive to the distance between said craft and said source of radiant energy for lessening the ratio of responsiveness of said steering means to said bearing angular variations as said source is approached.

2. In a radio homing automatic pilot for dirigible craft, a radio receiver means located on said craft, means cooperative with said receiver means for deriving signals proportional to departure in bearing of said craft from a predetermined line of movement to a radio transmitting station, rudder control means responsive to said signals for causing the craft to change its heading by an amount governed by the strength of said signals, and additional means for modifying the signal strength supplied to said rudder control means to lessen the same as the energy received from such station increases.

3. In a homing navigation system for a dirigible craft, the combination comprising a directional antenna on said craft, means cooperative therewith for producing signals proportional to changes in bearing of said craft from a predetermined bearing relative to a radio transmitting station, rudder control means controlled by said signals to direct said craft toward said predetermined bearing, and means for varying the corrective angle imported by said rudder control means for a given change in bearing as a function of the distance between said craft and said station.

4. In a radio homing automatic pilot for dirigible craft having a direction maintaining means and self-orienting directional antenna, means for producing a signal responsive to deviation in the bearing of the craft relative to a direction-giving source of radiant energy as detected jointly by said direction maintaining means and antenna, such as caused by a change in the bearing of said craft with respect to its original bearing in relation to said source, steering means controlled by said signal for changing the course of said craft until said original bearing is restored, and means for rendering said steering means progressively less sensitive as the distance from said radiant energy source decreases, whereby the response of the automatic pilot to off-course signals becomes substantially independent of the distance of the craft from said source.

5. In a navigation system for a dirigible craft, the combination comprising a self-orienting directional antenna adapted to orient itself relative to a source of radiant energy, means stabilized in azimuth, differential means adapted to produce responses proportional to the difference in instantaneous positions of said antenna and said stabilized means, rudder positioning means responsive to said differential means, and sensitivity-control means for varying the overall sensitivity of said rudder control means to said responses as an inverse function of the field strength of said radiant energy.

6. In a navigation system for a dirigible craft, the combination comprising a directional antenna adapted to orient itself relative to a source of radiant energy, means stabilized in azimuth, differential means adapted to produce responses proportional to the difference in instantaneous positions of said antenna and said stabilized means, rudder control means responsive to said differential means, and sensitivity control means for varying the sensitivity of said rudder control means to said responses as an inverse function of the field strength of said radiant energy, said sensitivity control means including automatic volume control means adapted to produce a control voltage increasing with said field strength.

7. In a navigation system for a dirigible craft, the combination comprising a directional antenna adapted to orient itself relative to a source of radiant energy, means stabilized in azimuth, differential means adapted to produce electrical responses varying as the difference in the instantaneous positions of said antenna and said stabilized means, variable gain amplifier means for amplifying said responses modified as an inverse function of the field strength of said radiant energy, and rudder control means movable according to amplified responses and being adapted to steer said craft in a direction to erase said difference.

8. In a navigation system for a dirigible craft, a directional antenna, means cooperative therewith for producing responses varying as the difference between a given heading and the instantaneous bearing of said craft relative to a radio transmitting station, means for regulating an amplitude characteristic of said responses as an inverse function of the distance between said craft and said station, and rudder control means controlled by said responses for turning said craft to an extent proportional to said amplitude characteristic and in a direction to erase said difference.

9. The combination as claimed in claim 8 including a radio receiver, and wherein said regulating means comprises an automatic volume control system in said receiver.

10. A method of homing a dirigible craft on a radio transmitting station, comprising determining the instantaneous angular difference between a direction-finding antenna and the craft's initial heading in azimuth, representing a deviation from a predetermined course, producing an impulse in response to said difference, controlling an amplitude characteristic of said impulse as an inverse function of the field strength of the received radio energy, and steering said craft through an angle proportional to said controlled amplitude characteristic and in a direction to erase said difference.

11. A method of homing a dirigible craft on a radio transmitting station, comprising determining the instantaneous difference between a direction-finding antenna and a given heading in azimuth, thereby denoting a deviation from a predetermined course, producing an impulse in response to said difference, steering said craft in response to said impulse and in a direction to erase said difference, and varying the ratio of course change to a given impulse as an inverse function of the field strength of the received radio energy.

12. In a method of homing a craft on a transmitting station, the steps comprising determining the deviation angle resulting from a departure of the craft from a predetermined course, changing the heading of the craft in response to a function of said angle, to direct said craft toward its course, and varying the ratio of the change of heading to a predetermined deviation angle as a function of the distance between said craft and said station.

13. In a method of homing a craft on a transmitting station, the steps comprising determining the deviation angle resulting from a departure of the craft from a predetermined course, changing the heading of the craft in response to a function of said angle, to direct said craft toward its course, and varying the ratio of the change of heading to a predetermined deviation angle as a function of the distance between said craft and said station, said ratio being rendered less than unity as said craft approaches said station.

14. In a radio homing automatically piloted aircraft, the combination with a direction-finding loop, of means controlled by the output thereof for automatically maintaining said loop in a predetermined relationship to the transmitting station, an azimuth position-maintaining device, means responsive to the relative angular deviation of said device and direction-finding loop for altering the heading of the craft, and means for limiting the change in heading to a function of the said angular deviation.

15. In a radio homing automatically piloted aircraft, the combination with a direction-finding loop, of means controlled by the output thereof for automatically maintaining said loop in a predetermined relationship to the transmitting station, an automatic pilot for the craft including an azimuth position-maintaining device, and means responsive to the relative angular deviation of said device and direction-finding loop for altering the heading of the craft through said automatic pilot, for proportioning the change in heading to a function of the angular deviation.

16. A radio homing device as claimed in claim 14, having a means for altering the amount of heading change per unit change in angular deviation according to the distance from the transmitting station.

17. In a method of homing a craft on a transmitting station, the steps comprising determining the deviation angle between the course and a directional antenna resulting from a departure of the craft from a direct course to said station, changing the heading of the craft in response to a function of said angle through an angle normally greater than said deviation angle, to direct said craft back toward its course and set up a proper drift angle, and varying the ratio of the change of heading to a predetermined deviation angle as an inverse function of the distance between said craft and said station, said ratio being rendered less than unity as said craft approaches said station.

18. The method of automatically steering an aircraft on a prescribed course relative to a radio transmitting station, comprising deriving corrective impulses from detected radiant energy variations resulting from transverse displacement of said craft from said course causing a deviation angle between said course and a directional antenna, compensating said impulses for unequal responses to equal displacements from said prescribed course at different distances from said station, said last-named step comprising varying the response per unit of variation as an inverse function of said distance, and controlling by said compensated impulses the steering of the craft.

ROBERT B. ROE.
JOHN B. GRAY.

REFERENCES CITED

The following references are of record in the file of this patent:

UNITED STATES PATENTS

| Number | Name | Date |
|---|---|---|
| 1,958,258 | Alexanderson | May 8, 1934 |
| 2,247,294 | Goble et al. | June 24, 1941 |